United States Patent
Xie

(10) Patent No.: US 12,487,480 B1
(45) Date of Patent: Dec. 2, 2025

(54) OPTICAL FILM STRUCTURE, BACKLIGHT MODULE, AND DISPLAY DEVICE

(71) Applicant: Guangzhou China Star Optoelectronics Semiconductor Display Technology Co., LTd., Guangdong (CN)

(72) Inventor: Tianxu Xie, Guangdong (CN)

(73) Assignee: Guangzhou China Star Optoelectronics Semiconductor Display Technology Co., Ltd., Guangdong (CN)

( * ) Notice: Subject to any disclaimer, the term of this patent is extended or adjusted under 35 U.S.C. 154(b) by 0 days.

(21) Appl. No.: 18/790,810

(22) Filed: Jul. 31, 2024

(30) Foreign Application Priority Data

Jul. 18, 2024 (CN) .......................... 202410969207.3

(51) Int. Cl.
  *G02F 1/13* (2006.01)
  *G02F 1/1335* (2006.01)
  *G02F 1/13357* (2006.01)

(52) U.S. Cl.
  CPC ...... *G02F 1/1323* (2013.01); *G02F 1/133607* (2021.01); *G02F 1/133615* (2013.01)

(58) Field of Classification Search
  CPC ............. G02F 1/1323; G02F 1/133607; G02F 1/133615
  See application file for complete search history.

(56) References Cited

U.S. PATENT DOCUMENTS

2007/0002220 A1 * 1/2007 Jang ...................... G02F 1/1323
  349/113

FOREIGN PATENT DOCUMENTS

| CN | 111679464 A | * | 9/2020 | ....... G02F 1/134309 |
| CN | 113703155 A | * | 11/2021 | ........... G02B 26/005 |
| CN | 110098241 B | * | 8/2022 | ............. H10K 59/12 |
| CN | 116009236 A | * | 4/2023 | |

* cited by examiner

*Primary Examiner* — Mariceli Santiago
(74) *Attorney, Agent, or Firm* — PV IP PC; Christopher S. Ruprecht; Wei Te Chung

(57) ABSTRACT

An optical film structure, a backlight module, and a display device are provided. The optical film structure includes a base layer and a viewing angle adjustment layer positioned on a light-emitting side of the base layer. The optical film structure features a narrow viewing angle mode and a wide viewing angle mode. In the narrow viewing angle mode, the viewing angle adjustment layer is configured to narrow the light's emission angle to a first emission angle. In the wide viewing angle mode, the viewing angle adjustment layer is configured to adjust the light's emission angle to a second emission angle, which is greater than the first emission angle. The optical film structure achieves the switching between narrow and wide viewing angle modes by adjusting the configuration of the viewing angle adjustment layer.

19 Claims, 4 Drawing Sheets

OPTICAL FILM STRUCTURE, BACKLIGHT MODULE, AND DISPLAY DEVICE

FIELD OF DISCLOSURE

The present application relates to a the field of display technology, specifically to an optical film structure, a backlight module, and a display device.

DESCRIPTION OF RELATED ART

In related technology, liquid crystal display devices include a display panel and a backlight module. The backlight module is typically equipped with an optical film assembly to enhance light extraction efficiency, such as with the inclusion of a brightness enhancement film and a diffusion film.

In the research and practice of related technology, the inventor of the present application discovered that once the optical film assembly is equipped, it is impossible to adjust viewing angles of the display device by adjusting the optical film assembly.

SUMMARY OF INVENTION

The embodiments of the present application provide an optical film structure, a backlight module, and a display device that can switch between narrow and wide viewing angles.

The present application provides an optical film structure, including:
 a base layer; and
 a viewing angle adjustment layer, disposed on a light-emitting side of the base layer;
 wherein the optical film structure features a narrow viewing angle mode and a wide viewing angle mode, and in the narrow viewing angle mode, the viewing angle adjustment layer narrows an emission angle of light to a first emission angle; in the wide viewing angle mode, the viewing angle adjustment layer adjusts the emission angle of light to a second emission angle; the second emission angle is greater than the first emission angle.

Optionally, in some embodiments of the present application, when the optical film structure is in the narrow viewing angle mode, the viewing angle adjustment layer includes a plurality of first prisms; each of the first prisms includes a first sidewall portion extending along a first direction and a second sidewall portion extending along a second direction; the first direction and the second directions intersect; the first sidewall portion and the second sidewall portion are connected, a first cavity is defined between the first prism and the base layer, and the first cavity is filled with a transparent medium.

Optionally, in some embodiments of the present application, when the optical film structure is in the wide viewing angle mode, the viewing angle adjustment layer includes a plurality of second prisms; each of the second prisms includes the first sidewall portion extending along a third direction and the second sidewall portion extending along a fourth direction; the third direction and the fourth direction intersect; the first sidewall portion and the second sidewall portion are connected, a second cavity is defined between the second prism and the base layer, and the second cavity is filled with the transparent medium;
 the first prism includes a first apex angle included by the first sidewall portion and the second sidewall portion; the second prism includes a second apex angle included by the first sidewall portion and the second sidewall portion, and the second apex angle is greater than the first apex angle.

Optionally, in some embodiments of the present application, when the optical film structure is in the wide viewing angle mode, a junction between each two adjacent second prisms makes contact with the base layer.

Optionally, in some embodiments of the present application, the first apex angle is an acute angle or a right angle, and the second apex angle is an obtuse angle.

Optionally, in some embodiments of the present application, when the optical film structure is in the wide viewing angle mode, the first sidewall portion and the second sidewall portion of the viewing angle adjustment layer adhere to the base layer.

When the optical film structure is in the wide viewing angle mode, in a thickness direction of the optical film structure, the first sidewall portion and the second sidewall portion of the viewing angle adjustment layer are partially overlapped.

Optionally, in some embodiments of the present application, when the optical film structure is in the narrow viewing angle mode, the viewing angle adjustment layer is separated from the base layer, with the transparent medium interposed between the viewing angle adjustment layer and the base layer.

Optionally, in some embodiments of the present application, when the optical film structure is in the narrow viewing angle mode, a junction between each two adjacent first prisms is fixedly connected to the base layer.

Optionally, in some embodiments of the present application, the transparent medium includes one of a gas or a liquid.

Optionally, in some embodiments of the present application, the viewing angle adjustment layer includes a flexible layer and scattering particles, with the scattering particles disposed within the flexible layer.

Correspondingly, the present application further provides a backlight module, including the above-mentioned optical film structure.

Correspondingly, the present application further provides a display device, including a display panel and the above-mentioned backlight module, wherein the display panel is disposed on a light-emitting side of the backlight module.

The optical film structure of the embodiments of the present application features both a narrow viewing angle mode and a wide viewing angle mode. The optical film structure includes a base layer and a viewing angle adjustment layer located on a light-emitting side of the base layer. The embodiments of this application achieve the switch between the narrow viewing angle mode and the wide viewing angle mode by adjusting the configuration of the viewing angle adjustment layer.

BRIEF DESCRIPTION OF DRAWINGS

The technical solutions and other beneficial effects of this application will become apparent through a detailed description of specific embodiments, in conjunction with the accompanying drawings.

DETAILED DESCRIPTION OF EMBODIMENTS

The following detailed description of the embodiments of the present application will be made clear and complete in conjunction with the accompanying drawings. It is obvious that the described embodiments are merely a part of the embodiments of the present application, and not all of them. Based on the embodiments in this application, all other embodiments obtained by those skilled in the art without creative effort fall within the scope of protection of this application. Moreover, it should be understood that the specific embodiments described here are only used for explaining and illustrating this application and are not intended to limit the scope of the application. In this application, various embodiments can be combined with each other, which is not redundantly described. Unless stated otherwise, the positional terms such as "above" and "below" generally refer to the orientation during actual use or operational state of the device, specifically as shown in the direction of the drawings; "inside" and "outside" refer to the outline of the device; and the terms "first," "second," "third," etc., are used solely for identification purposes and do not imply any numerical requirements or established order.

The following disclosure provides numerous different embodiments or examples for implementing various structures of this application. To simplify the disclosure, the following text describes specific components and configurations of particular examples. Certainly, these are provided merely as examples and are not intended to limit the scope of this application. Additionally, the application may repeat reference numbers and/or letters across different examples for the sake of simplicity and clarity; this repetition does not indicate any relationship between the various embodiments and/or configurations discussed. Furthermore, the application provides examples of specific techniques and materials, but those skilled in the art can recognize the applicability of other techniques and/or the use of other materials.

The embodiments of the present application provide an optical film structure, a backlight module, and a display device, which are described in detail below. It should be noted that the sequence of descriptions of the following embodiments does not limit the preferred order of these embodiments.

Figure 1:
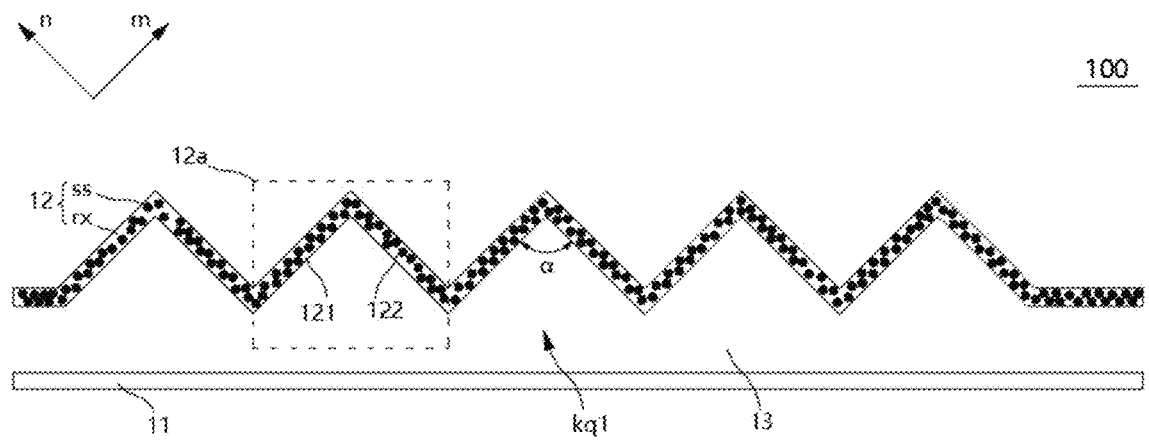
FIG. 1 is a structural schematic view of an optical film structure in a narrow viewing angle mode, as provided by one embodiment of the present application.
Figure 2:
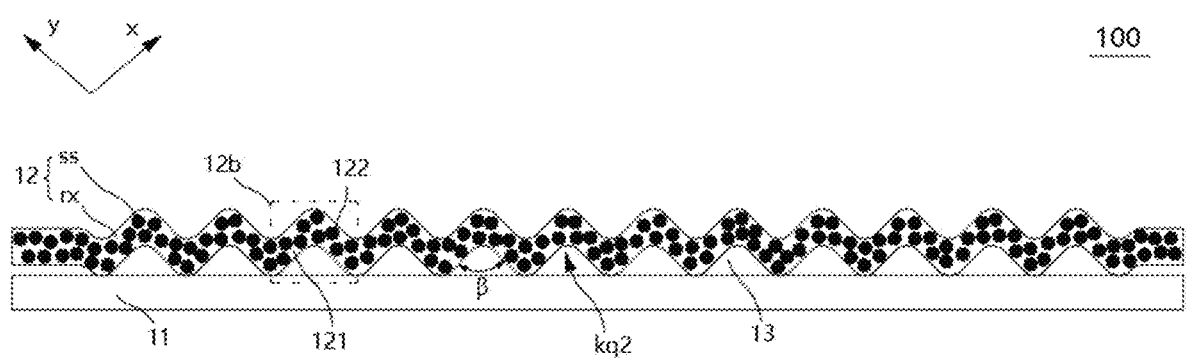
FIG. 2 is a structural schematic view of the optical film structure in a wide viewing angle mode, as provided by one embodiment of the present application.

Please refer to FIG. 1 and FIG. 2. The embodiment of the application provides an optical film structure 100, which includes a base layer 11 and a viewing angle adjustment layer 12. The viewing angle adjustment layer 12 is positioned on a light-emitting side of the base layer 11.

The optical film structure 100 features a narrow viewing angle mode and a wide viewing angle mode. When the optical film structure 100 is in the narrow viewing angle mode, the viewing angle adjustment layer 12 is configured to narrow the emission angle of light to a first emission angle. When the optical film structure 100 is in the wide viewing angle mode, the viewing angle adjustment layer 12 is configured to adjust the emission angle of light to a second emission angle, where the second emission angle is greater than the first emission angle.

The optical film structure 100 of the present embodiment switches between the narrow viewing angle mode and the wide viewing angle mode by adjusting the configuration of the viewing angle adjustment layer 12.

It is important to understand that in the narrow viewing angle mode, the viewing angle adjustment layer 12 narrows the emission angle of light to achieve a narrow view. In the wide viewing angle mode, the viewing angle adjustment layer 12 adjusts the emission angle of light to be greater than the emission angle of light in the narrow viewing angle mode to achieve a wide view.

The viewing angle adjustment layer 12 is elastic and can assume different configurations in different modes to switch between narrow and wide viewing angles. For instance, in the narrow viewing angle mode, the viewing angle adjustment layer 12 is pushed up by a transparent medium and stretched under the pressure of the transparent medium to form a first prism film, which narrows the viewing angle. In this state, the viewing angle adjustment layer 12 is in a stretched condition and has a first elastic force. In the wide viewing angle mode, the viewing angle adjustment layer 12 either lacks elastic force or has a second elastic force that is less than the first elastic force. That is, the viewing angle adjustment layer 12 is not pushed and stretched by the transparent medium or is pushed and stretched to a lesser extent than in the narrow viewing angle mode, thus achieving a wide viewing angle.

Optionally, in some embodiments, the base layer 11 is a transparent film layer, which can have a smooth, entire surface form.

A material of the base layer 11 can be one of the following: silicon dioxide, polyethylene, polypropylene, polystyrene, polylactic acid, polyethylene terephthalate, polyethylene naphthalate, polycarbonate, polyethersulfone, aromatic fluorobenzene containing polyarylate, polycyclic olefin, polyimide, or polyurethane.

Optionally, in some embodiments, a thickness of the base layer 11 ranges from 50 micrometers to 250 micrometers, such as 50 micrometers, 60 micrometers, 70 micrometers, 80 micrometers, 90 micrometers, 100 micrometers, 110 micrometers, 120 micrometers, 130 micrometers, 140 micrometers, 150 micrometers, 160 micrometers, 170 micrometers, 180 micrometers, 190 micrometers, 200 micrometers, 210 micrometers, 220 micrometers, 230 micrometers, 240 micrometers, or 250 micrometers.

It should be understood that, as the thickness of the base layer 11 increases, its resistance to pressure also increases, as does its optical loss. Therefore, in order to achieve both good support and pressure resistance with a narrow viewing angle, the thickness of the base layer 11 is selected to be between 50 micrometers and 250 micrometers.

Optionally, in some embodiments of this application, the viewing angle adjustment layer 12 includes a flexible layer rx and scattering particles ss, with the scattering particles ss positioned within the flexible layer rx.

It can be understood that placing the scattering particles ss within the viewing angle adjustment layer 12 can increase the haze of the viewing angle adjustment layer 12, thereby enhancing the scattering effect on light and improving the uniformity of brightness. Additionally, in some embodiments, the scattering particles ss within the viewing angle adjustment layer 12 can be transferred to the base layer 11 to achieve improved brightness uniformity; alternatively, the scattering particles ss can be omitted, meaning that the flexible layer rx alone constitutes the viewing angle adjustment layer 12.

Optionally, the material of the flexible layer rx can be a transparent organic material, such as one of polyethylene, polypropylene, polystyrene, polylactic acid, polyethylene terephthalate, polyethylene naphthalate, polycarbonate, polyethersulfone, aromatic fluorobenzene containing polyarylate, polycyclic olefin, polyimide, or polyurethane.

The thicker the flexible layer rx, the better its pressure resistance and the greater the number of scattering particles ss that can be doped into it. To meet the needs for both pressure resistance and high haze, the thickness of the flexible layer rx is between 50 micrometers and 200 micrometers. For example, it can be 50 micrometers, 60 micrometers, 70 micrometers, 80 micrometers, 90 micrometers, 100 micrometers, 110 micrometers, 120 micrometers, 130 micrometers, 140 micrometers, 150 micrometers, 160 micrometers, 170 micrometers, 180 micrometers, 190 micrometers, or 200 micrometers.

A particle size of the scattering particles (ss) ranges from 1 micrometer to 30 micrometers, such as 1 micrometer, 2 micrometers, 3 micrometers, 4 micrometers, 5 micrometers, 6 micrometers, 7 micrometers, 8 micrometers, 9 micrometers, 10 micrometers, 11 micrometers, 12 micrometers, 13 micrometers, 14 micrometers, 15 micrometers, 16 micrometers, 17 micrometers, 18 micrometers, 19 micrometers, 20 micrometers, 21 micrometers, 22 micrometers, 23 micrometers, 24 micrometers, 25 micrometers, 26 micrometers, 27 micrometers, 28 micrometers, 29 micrometers, or 30 micrometers.

It is understood that the larger the particle size of the scattering particles ss, the thicker the necessary thickness of the flexible layer rx, and the lower the density of scattering particles ss that can be set within the viewing angle adjustment layer 12, resulting in poorer scattering effects. Therefore, having the particle size of the scattering particles ss range from 1 micrometer to 30 micrometers allows the thickness of the viewing angle adjustment layer 12 to not be excessively thick while maintaining good scattering effects.

Referring to FIG. 1 and FIG. 2, in some embodiments of the present application, the viewing angle adjustment layer 12 can be entirely separated from the base layer 11.

When the optical film structure 100 is in the narrow viewing angle mode, the viewing angle adjustment layer 12 includes a plurality of first prisms 12a. Each first prism 12a includes a first sidewall portion 121 extending along a first direction m, and a second sidewall portion 122 extending along a second direction n. The first direction m and the second direction n intersect. The first sidewall portion 121 and the second sidewall portion 122 are connected. Between the first prism 12a and the base layer 11, a first cavity kq1 is formed, which is filled with a transparent medium 13.

It should be noted that, in the narrow viewing angle mode, the transparent medium 13 enters between the base layer 11 and the viewing angle adjustment layer 12. As the amount of the transparent medium 13 increases, the transparent medium 13 props up the viewing angle adjustment layer 12, causing the viewing angle adjustment layer 12 to form a prism. As the transparent medium 13 increases, the prism is gradually stretched, and an apex angle of the prism become smaller, enhancing the effect of narrowing the light. In the narrow viewing angle mode, the narrowing effect on light by the viewing angle adjustment layer 12 can be adjusted by controlling the input of the transparent medium 13, depending on actual needs.

Optionally, in the narrow viewing angle mode, the transparent medium 13 fills the first cavity kq1, causing the viewing angle adjustment layer 12 to form a first prism 12a. The apex angle of the first prism 12a, denoted as a first apex angle $\alpha$, is the included angle between the extension directions of the first sidewall portion 121 and the second sidewall portion 122.

In some embodiments of the present application, when the optical film structure 100 is in the narrow viewing angle mode, the viewing angle adjustment layer 12 is entirely separated from the base layer 11, with the transparent medium 13 spaced between the viewing angle adjustment layer 12 and the base layer 11.

It is understood that since the viewing angle adjustment layer 12 can be completely separated from the base layer 11, it allows the transparent medium 13 to be introduced into the first cavity kq1 through a single channel, which also reduces the complexity of connecting the viewing angle adjustment layer 12 with the base layer 11.

Additionally, optionally, a periphery of the viewing angle adjustment layer 12 can be connected to a periphery of the base layer 11 via connectors, or parts of the periphery of the viewing angle adjustment layer 12 can be connected to parts of the periphery of the base layer 11 to form a sealed first cavity kq1.

Optionally, in some embodiments of the present application, the transparent medium 13 includes either a gas or a liquid. The following description uses an example of the transparent medium 13 being a gas.

In some embodiments of the present application, when the optical film structure 100 is in the wide viewing angle mode, the viewing angle adjustment layer 12 includes a plurality of second prisms 12b. Each second prism 12b includes the first sidewall portion 121 extending along a third direction x and the second sidewall portion 122 extending along a fourth direction y, where the third direction x and the fourth direction y intersect. The first sidewall portion 121 and the second sidewall portion 122 are connected. Between the second prism 12b and the base layer 11, a second cavity kq2 is formed. The second cavity kq2 is filled with the transparent medium 13.

The first prism 12a has a first apex angle $\alpha$, formed by the first sidewall portion 121 and the second sidewall portion 122. The second prism 12b has a second apex angle $\beta$, also formed by the first sidewall portion 121 and the second sidewall portion 122, where the second apex angle $\beta$ is larger than the first apex angle $\alpha$.

Figure 3:
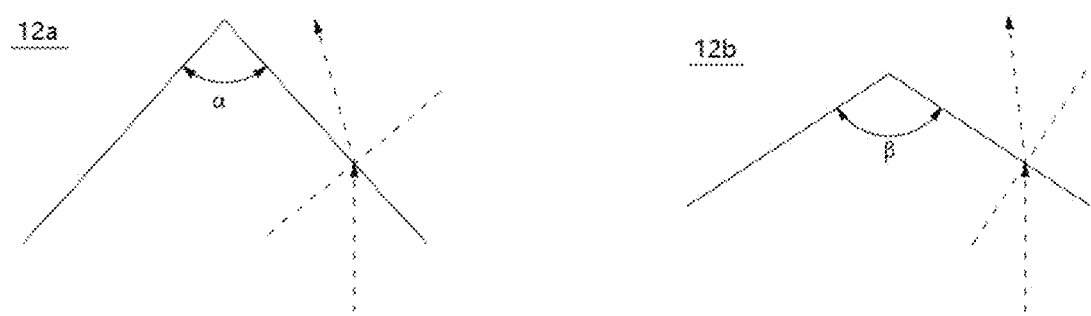
FIG. 3 is a light path diagram through a first prism and a second prism of the optical film structure, as provided by one embodiment of the present application.

It should be noted, as referenced in FIG. 3, compared to the narrow viewing angle mode, the amount of the transparent medium 13 in the optical film structure 100 in the wide viewing angle mode is reduced. This reduction decreases the extent to which the first prism 12a is stretched, causing the first sidewall portion 121 and the second sidewall portion 122 to retract and collapse to form the second prism 12b. Due to the retraction and collapse of the first sidewall portion 121 and the second sidewall portion 122, the first cavity kq1 shrinks, lowering the angle of the first apex angle α to the second apex angle β. The first cavity kq1 is reduced to the second cavity kq2, thereby making the second apex angle β better at expanding the light emission angle compared to the first apex angle α, thus achieving a wide viewing angle.

For example, as shown in FIG. 3, when light at the same angle radiates to the first prism 12a and the second prism 12b, the smaller angle of the first apex angle α of the first prism 12a allows the first prism 12a to narrow the light angle more significantly than the second prism 12b, which narrows the angle to a lesser extent. Therefore, relatively speaking, the first prism 12a can achieve a narrow viewing angle, while the second prism 12b can achieve a wide viewing angle.

Optionally, in some embodiments of this application, the first apex angle α is an acute angle or a right angle, while the second apex angle β is an obtuse angle.

The first apex angle α being an acute or right angle can better narrow the emission angle of light. The second apex angle β being an obtuse angle can better reduce the extent to which the light's emission angle is narrowed, thereby better distinguishing between narrow and wide viewing angles. For example, the first apex angle α can be 45 degrees, and the second apex angle β can be 135 degrees; or the first apex angle α can be 90 degrees, and the second apex angle β can be 150 degrees.

Optionally, in some embodiments of the present application, when the optical film structure 100 is in the wide viewing angle mode, junctions 12c between adjacent second prisms 12b make contact with the base layer 11.

It is understandable that the contact of the junctions 12c with the base layer 11 not only minimizes the size of the second cavity kq2, reducing the thickness of the optical film structure 100, but also restores the viewing angle adjustment layer 12 to a non-elastic state, thereby improving the lifespan of the viewing angle adjustment layer 12.

Optionally, the junction 12c can make contact with the base layer 11 via electrostatic adhesion.

It should be noted that the number of the prisms corresponding to the two modes depicted in FIG. 1 and FIG. 2 is merely illustrative and does not represent inconsistency in the number of the prisms between the two modes. The number of the prisms shown in the corresponding drawings below also serves merely an illustrative purpose.

Figure 4:
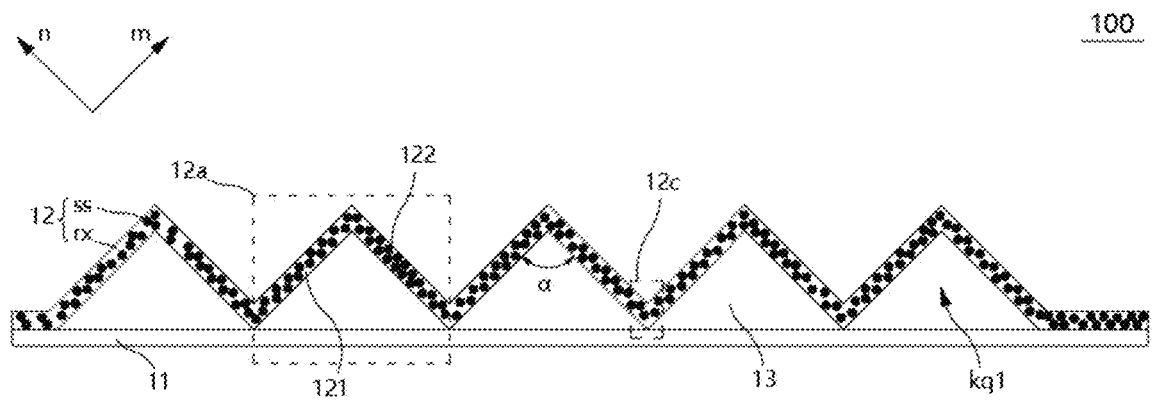
FIG. 4 is another structural schematic view of the optical film structure in the narrow viewing angle mode, as provided by one embodiment of the present application.
Figure 5:
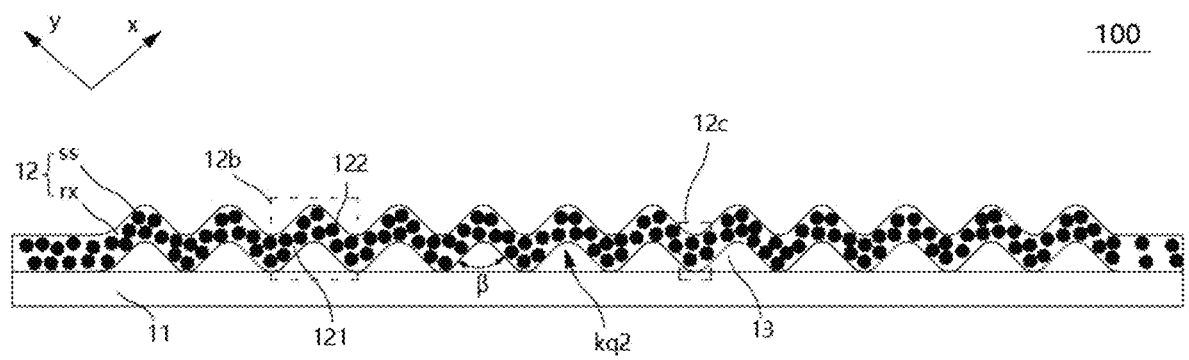
FIG. 5 is another structural schematic view of the optical film structure in the wide viewing angle mode, as provided by one embodiment of the present application.

Please refer to FIG. 4 and FIG. 5. FIG. 4 shows an illustrative view of the optical film structure 100 in the narrow viewing angle mode, according to one or more disclosed embodiments. FIG. 5 shows an illustrative view corresponding to FIG. 4 of the optical film structure 100 in the wide viewing angle mode, according to one or more disclosed embodiments.

In FIG. 4 and FIG. 5, parts that differ from the above-mentioned embodiments are described to avoid redundant explanation.

Referring to FIG. 4 and FIG. 5, the viewing angle adjustment layer 12 in the optical film structure 100 is fixedly connected at intervals to the base layer 11. This means the viewing angle adjustment layer 12 is periodically fixed to the base layer 11. For example, there is at least one prism structure between any two fixed connection areas. Specifically, in the narrow viewing angle mode, there is at least one first prism 12a between any two fixed connection areas; in the wide viewing angle mode, there is at least one second prism 12b between any two fixed connection areas.

Optionally, in some embodiments, when the optical film structure 100 is in the narrow viewing angle mode, the junctions 12c between adjacent first prisms 12a are fixedly connected to the base layer 11. Similarly, when the optical film structure 100 is in the wide viewing angle mode, the junctions 12c between adjacent second prisms 12b are fixedly connected to the base layer 11.

It should be noted that the fixed connection area refers to an area where the junction 12c is connected to the base layer 11. The junction 12c can be connected to the base layer 11 by gluing, but is not limited to this method; for example, it could be a heat fusion connection.

The viewing angle adjustment layer 12 is fixedly connected at intervals to the base layer 11, securing the position of the prisms and mitigating the risk of displacement. Furthermore, because the viewing angle adjustment layer 12 is fixedly connected at intervals to the base layer 11, it allows for a reduction in the amount of the transparent medium 13 required when forming the same first apex angle α in the narrow viewing angle mode, thus lowering a height of the first prism 12a and reducing a thickness of the optical film structure 100.

Figure 6:
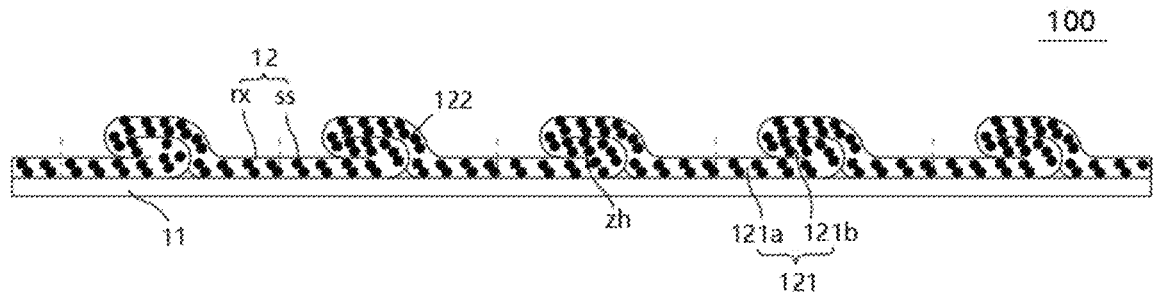
FIG. 6 is yet another structural schematic view of the optical film structure in the wide viewing angle mode, as provided by one embodiment of the present application.

Refer to FIG. 6, which shows another illustrative view of the optical film structure 100 in the wide viewing angle mode, according to one or more disclosed embodiments.

In FIG. 6, parts that differ from the above-mentioned embodiments are described to avoid redundant explanation.

Please refer to FIG. 6, in some embodiments of this application, when the optical film structure 100 is in the wide viewing angle mode, the first sidewall portion 121 and the second sidewall portion 122 of the viewing angle adjustment layer 12 adhere to the base layer 11.

It should be noted that, compared to the optical film structure 100 in the wide viewing angle mode shown in FIG. 2 and FIG. 5, the optical film structure 100 in FIG. 6 has the transparent medium 13 withdrawn from the first cavity kq1. This causes the first prism 12a to collapse, and the first sidewall portion 121 and the second sidewall portion 122 of the viewing angle adjustment layer 12 to adhere to the base layer 11. In this configuration, the viewing angle adjustment layer 12 does not maintain a prismatic shape, allowing for a wider viewing angle, meaning that the light has a greater emission angle.

Optionally, the first sidewall portion 121 and the second sidewall portion 122 can adhere to the base layer 11 using electrostatic adhesion or can be adhered using vacuum adhesion.

In some embodiments of the present application, when the optical film structure 100 is in the wide viewing angle mode, the first sidewall portion 121 and the second sidewall portion 122 of the viewing angle adjustment layer 12 are partially overlapped in a thickness direction of the optical film structure 100.

In this arrangement, the partial overlap of the first sidewall portion 121 and the second sidewall portion 122 creates an overlapping area with enhanced scattering effects, improving the uniformity of brightness.

Optionally, in some embodiments of the present application, a crease zh is added to either the first sidewall portion 121 or the second sidewall portion 122, extending in the direction of the extension of the first prism 12a.

For instance, considering a crease zh on the first sidewall portion 121, when the optical film structure 100 switches from narrow to wide viewing angle mode, and as the transparent medium 13 is withdrawn to a certain extent, the first sidewall portion 121 bends along the crease zh, forming a first folded part 121a and a second folded part 121b. The first folded part 121a adheres to the base layer 11, and the second folded part 121b stacks on top of the first folded part 121a. The first folded part 121a and the second folded part 121b are at least partially overlapped, while the second sidewall portion 122 collapses and is stacked on the second folded part 121b.

The presence of the crease zh allows for regular folding of the first sidewall portion 121 and the second sidewall portion 122, improving the uniformity of brightness.

Optionally, in some embodiments, the number of the scattering particles ss inside the second folded part 121b is less than the number of the scattering particles ss inside the first folded part 121a. On one hand, this configuration causes the first folded part 121a to be heavier than the second folded part 121b, giving the first folded part 121a better rigidity and reducing the risk of wrinkling of the first folded part 121a. On the other hand, since the second folded part 121b has fewer scattering particles ss, it is more flexible and easier to bend. Additionally, since the first folded part 121a and the second folded part 121b are stacked, the area where they overlap contains a double layer of the scattering particles ss, so having fewer scattering particles ss in the second folded part 121b can enhance the uniformity of light emission overall.

Figure 7:
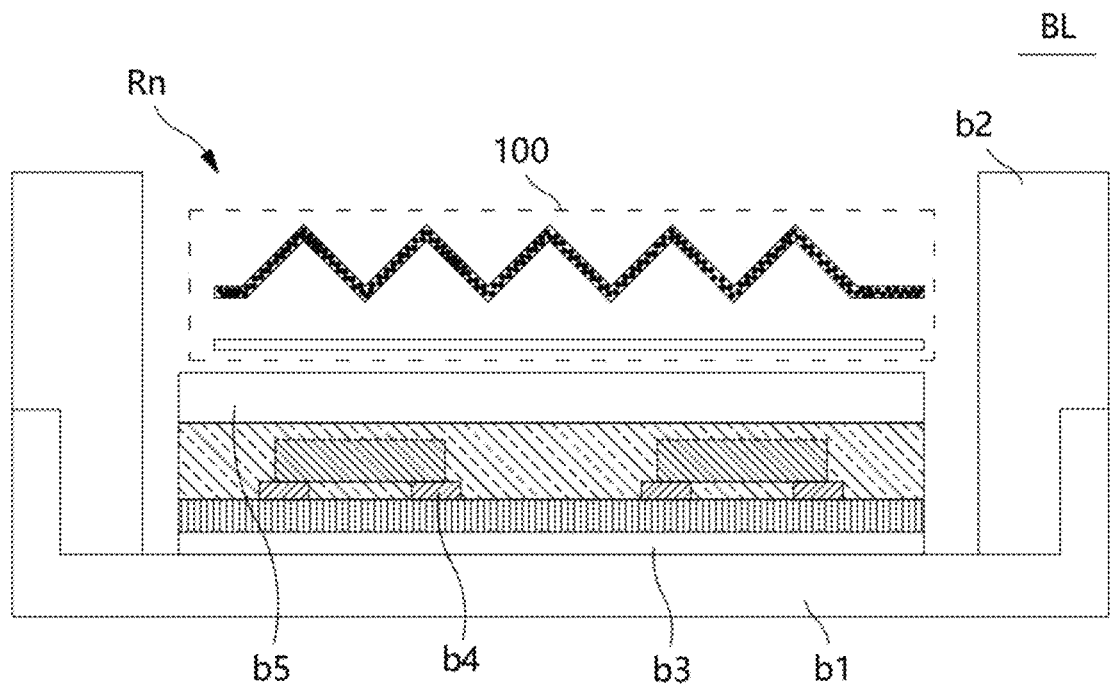
FIG. 7 is a structural schematic view of a backlight module in the narrow viewing angle mode, as provided by one embodiment of the present application.
Figure 8:
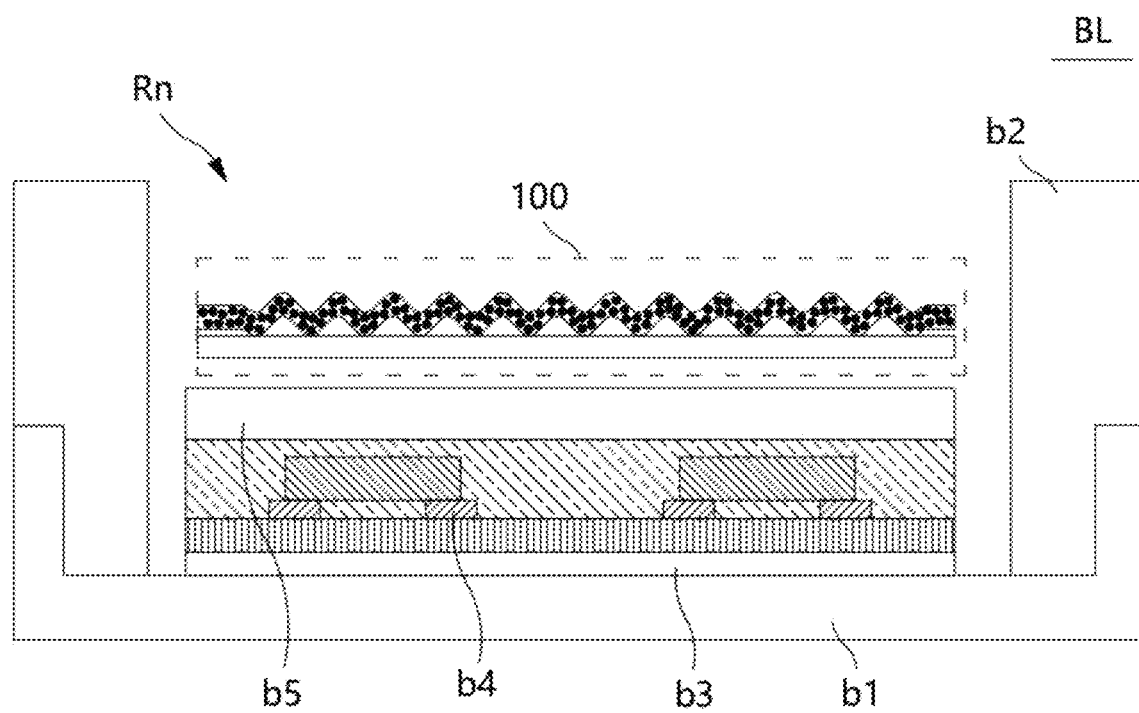
FIG. 8 is a structural schematic view of the backlight module in the wide viewing angle mode, as provided by one embodiment of the present application.

Refer to FIG. 7 and FIG. 8, this embodiment of the present application also provides a backlight module BL, which includes the optical film structure 100 as described in any of the above embodiments.

It should be noted that an optical film structure of the backlight module BL in this embodiment is similar or identical to the optical film structure 100 described in any of the aforementioned embodiments, therefore further detail is not reiterated here. Additionally, although the backlight module BL of this embodiment is illustrated based on the optical film structure 100 corresponding to FIG. 1 and FIG. 2, it is not limited to these. For example, it could be based on the optical film structure 100 corresponding to FIG. 4 and FIG. 5, or based on the optical film structure 100 corresponding to FIG. 1 and FIG. 6, or even the optical film structure 100 corresponding to FIG. 4 and FIG. 6.

In this embodiment, the backlight module BL is illustrated as a direct-lit type as an example, but is not limited thereto. For example, the backlight module BL can be an edge-lit type.

In some embodiments, the backlight module BL can further include a back frame b1, a support frame b2, a first adhesive layer b3, a light-emitting device board b4, and a quantum dot film b5.

The support frame b2 is set on the back frame b1 and connected to a periphery of the back frame b1 to form an accommodation cavity Rn for accommodation. The light-emitting device board b4 is connected to the back frame b1 through the first adhesive layer b3 and located within the accommodation cavity Rn. The quantum dot film b5 is positioned on the light-emitting device board b4. The optical film structure 100 is set on the quantum dot film b5.

Among them, light-emitting devices on the light-emitting device board b4 emit blue light, and the quantum dot film b5 is used to convert the blue light into white light, which is then directed towards the optical film structure 100.

It should be understood that in some embodiments, if the light-emitting device board b4 can emit white light, then the use of the quantum dot film b5 can be omitted.

Figure 9:
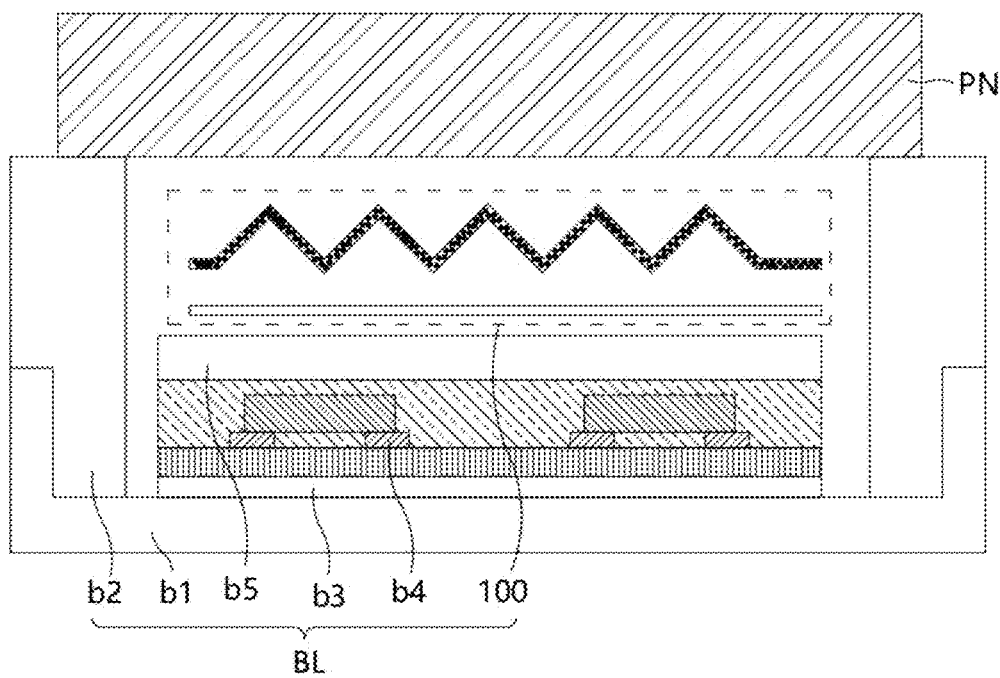
FIG. 9 is a structural schematic view of a display device in the narrow viewing angle mode, as provided by one embodiment of the present application.
Figure 10:
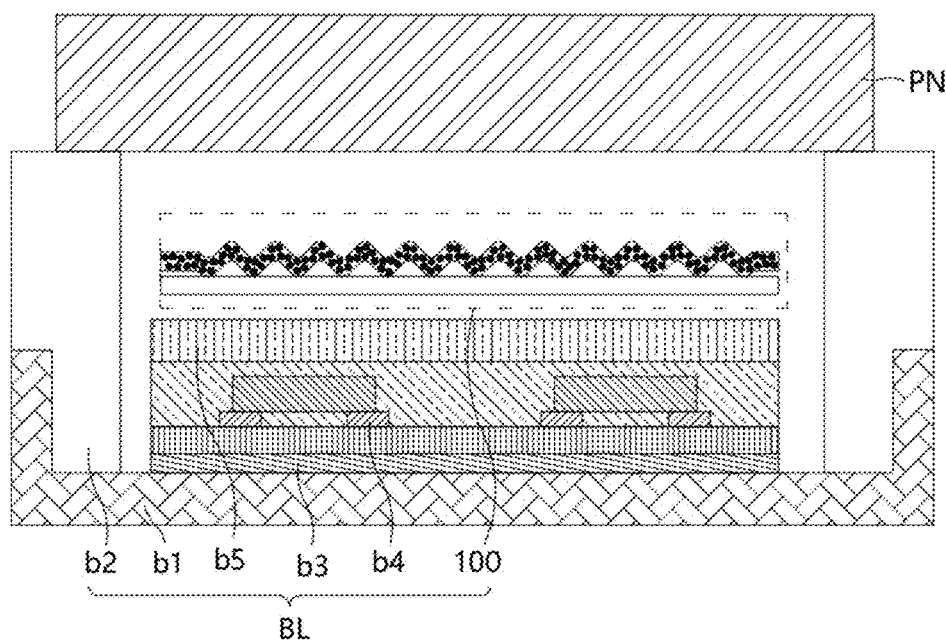
FIG. 10 is a structural schematic view of the display device in the wide viewing angle mode, as provided by one embodiment of the present application.

Referring to FIG. 9 and FIG. 10, this embodiment of the application also provides a display device 1000, which includes a display panel PN and the backlight module BL as described in any of the above embodiments, with the display panel PN located on a light-emitting side of the backlight module BL.

It should be noted that the backlight module of the display device 1000 in this embodiment is similar or identical to the backlight module BL described in any of the aforementioned embodiments, therefore further detail is not reiterated here. Additionally, although the backlight module BL of the display device 1000 is illustrated based on the optical film structure 100 corresponding to FIG. 1 and FIG. 2, it is not limited in this regard. For example, it can be based on the optical film structure 100 corresponding to FIG. 4 and FIG. 5, or based on the optical film structure 100 corresponding to FIG. 1 and FIG. 6, or even the optical film structure 100 corresponding to FIG. 4 and FIG. 6.

In this embodiment, the optical film structure 100 of the display device 1000 has narrow and wide viewing angle modes. The optical film structure 100 includes the base layer 11 and the viewing angle adjustment layer 12 located on the light-emitting side of the base layer 11. This embodiment switches between the narrow and wide viewing angle modes of the display device 1000 by adjusting the configuration of the viewing angle adjustment layer 12.

Optionally, the display panel PN can be a liquid crystal display panel, whose driving architecture can be based on Fringe Field Switching (FFS) technology, In-Plane Switching (IPS) technology, or Vertical Alignment (VA) technology.

Optionally, the display device 1000 can be applied to various products and used within such products, including, for example, televisions, notebook computers, monitors, billboards, Internet of Things (IoT) devices, and portable electronic devices such as mobile phones, smartphones, tablet personal computers, mobile communication terminals, electronic notepads, e-books, portable multimedia players (PMP), navigation devices, and ultra-mobile personal computers (UMPC).

Furthermore, in some embodiments, the display device 1000 can be applied to wearable devices and used within such wearable devices, including smartwatches, watch phones, glasses-type displays, and head-mounted displays (HMID). Additionally, in some embodiments, the display device 1000 can be applied to automotive applications such as instrument panels, central dashboards, or central information displays (CID) mounted on dashboards, interior mirror displays that replace side mirrors, and entertainment systems for rear-seat passengers arranged on the back of the front seats.

A detailed introduction to the optical film structure, the backlight module, and the display device provided by the present application has been presented above, with specific examples used to explain the principles and embodiments of the present application. The description of the above embodiments is merely intended to help understand the method of the application and its core ideas. At the same time, for those skilled in the art, there will be variations in specific implementations and application scope based on the ideas of this application. Therefore, the contents of this specification should not be construed as limiting the application.

What is claimed is:
1. An optical film structure, comprising:
  a base layer; and
  a viewing angle adjustment layer, disposed on a light-emitting side of the base layer, wherein the viewing angle adjustment layer comprises a flexible layer and scattering particles, with the scattering particles disposed within the flexible layer;

wherein the optical film structure features a narrow viewing angle mode and a wide viewing angle mode, and in the narrow viewing angle mode, the viewing angle adjustment layer narrows an emission angle of light to a first emission angle; in the wide viewing angle mode, the viewing angle adjustment layer adjusts the emission angle of light to a second emission angle; the second emission angle is greater than the first emission angle.

2. The optical film structure according to claim 1, wherein when the optical film structure is in the narrow viewing angle mode, the viewing angle adjustment layer comprises a plurality of first prisms; each of the first prisms comprises a first sidewall portion extending along a first direction and a second sidewall portion extending along a second direction; the first direction and the second directions intersect; the first sidewall portion and the second sidewall portion are connected, a first cavity is defined between the first prism and the base layer, and the first cavity is filled with a transparent medium.

3. The optical film structure according to claim 2, wherein when the optical film structure is in the wide viewing angle mode, the viewing angle adjustment layer comprises a plurality of second prisms; each of the second prisms comprises the first sidewall portion extending along a third direction and the second sidewall portion extending along a fourth direction; the third direction and the fourth direction intersect; the first sidewall portion and the second sidewall portion are connected, a second cavity is defined between the second prism and the base layer, and the second cavity is filled with the transparent medium;

the first prism comprises a first apex angle included by the first sidewall portion and the second sidewall portion; the second prism comprises a second apex angle included by the first sidewall portion and the second sidewall portion, and the second apex angle is greater than the first apex angle.

4. The optical film structure according to claim 3, wherein when the optical film structure is in the wide viewing angle mode, a junction between each two adjacent second prisms makes contact with the base layer.

5. The optical film structure according to claim 3, wherein the first apex angle is an acute angle or a right angle, and the second apex angle is an obtuse angle.

6. The optical film structure according to claim 2, wherein when the optical film structure is in the wide viewing angle mode, the first sidewall portion and the second sidewall portion of the viewing angle adjustment layer adhere to the base layer.

7. The optical film structure according to claim 6, wherein when the optical film structure is in the wide viewing angle mode, in a thickness direction of the optical film structure, the first sidewall portion and the second sidewall portion of the viewing angle adjustment layer are partially overlapped.

8. The optical film structure according to claim 2, wherein when the optical film structure is in the narrow viewing angle mode, the viewing angle adjustment layer is separated from the base layer, with the transparent medium interposed between the viewing angle adjustment layer and the base layer.

9. The optical film structure according to claim 2, wherein when the optical film structure is in the narrow viewing angle mode, a junction between each two adjacent first prisms is fixedly connected to the base layer.

10. The optical film structure according to claim 2, wherein the transparent medium comprises one of a gas or a liquid.

11. A backlight module, comprising an optical film structure, wherein the optical film structure comprises:
a base layer; and
a viewing angle adjustment layer, disposed on a light-emitting side of the base layer, wherein the viewing angle adjustment layer comprises a flexible layer and scattering particles, with the scattering particles disposed within the flexible layer;

wherein the optical film structure features a narrow viewing angle mode and a wide viewing angle mode, and in the narrow viewing angle mode, the viewing angle adjustment layer narrows an emission angle of light to a first emission angle; in the wide viewing angle mode, the viewing angle adjustment layer adjusts the emission angle of light to a second emission angle; the second emission angle is greater than the first emission angle.

12. The backlight module according to claim 11, wherein when the optical film structure is in the narrow viewing angle mode, the viewing angle adjustment layer comprises a plurality of first prisms; each of the first prisms comprises a first sidewall portion extending along a first direction and a second sidewall portion extending along a second direction; the first direction and the second directions intersect; the first sidewall portion and the second sidewall portion are connected, a first cavity is defined between the first prism and the base layer, and the first cavity is filled with a transparent medium.

13. The backlight module according to claim 12, wherein when the optical film structure is in the wide viewing angle mode, the viewing angle adjustment layer comprises a plurality of second prisms; each of the second prisms comprises the first sidewall portion extending along a third direction and the second sidewall portion extending along a fourth direction; the third direction and the fourth direction intersect; the first sidewall portion and the second sidewall portion are connected, a second cavity is defined between the second prism and the base layer, and the second cavity is filled with the transparent medium;

the first prism comprises a first apex angle included by the first sidewall portion and the second sidewall portion; the second prism comprises a second apex angle included by the first sidewall portion and the second sidewall portion, and the second apex angle is greater than the first apex angle.

14. The backlight module according to claim 13, wherein when the optical film structure is in the wide viewing angle mode, a junction between each two adjacent second prisms makes contact with the base layer, wherein the first apex angle is an acute angle or a right angle, and the second apex angle is an obtuse angle.

15. The backlight module according to claim 12, wherein when the optical film structure is in the wide viewing angle mode, the first sidewall portion and the second sidewall portion of the viewing angle adjustment layer adhere to the base layer.

16. The backlight module according to claim 15, wherein when the optical film structure is in the wide viewing angle mode, in a thickness direction of the optical film structure, the first sidewall portion and the second sidewall portion of the viewing angle adjustment layer are partially overlapped.

17. The backlight module according to claim 12, wherein when the optical film structure is in the narrow viewing angle mode, the viewing angle adjustment layer is separated from the base layer, with the transparent medium interposed between the viewing angle adjustment layer and the base layer; when the optical film structure is in the narrow viewing angle mode, a junction between each two adjacent first prisms is fixedly connected to the base layer.

18. The backlight module according to claim 11, wherein the viewing angle adjustment layer comprises a flexible layer and scattering particles, with the scattering particles disposed within the flexible layer.

19. A display device, comprising:
   a display panel; and
   a backlight module comprising an optical film structure, wherein the optical film structure comprises:
   a base layer; and
   a viewing angle adjustment layer, disposed on a light-emitting side of the base layer, wherein the viewing angle adjustment layer comprises a flexible layer and scattering particles, with the scattering particles disposed within the flexible layer;
   wherein the optical film structure features a narrow viewing angle mode and a wide viewing angle mode, and in the narrow viewing angle mode, the viewing angle adjustment layer narrows an emission angle of light to a first emission angle; in the wide viewing angle mode, the viewing angle adjustment layer adjusts the emission angle of light to a second emission angle; the second emission angle is greater than the first emission angle;
   wherein the display panel is disposed on a light-emitting side of the backlight module.

* * * * *